Jan. 10, 1967     J. J. FESCO     3,297,231
DISPOSABLE FILTER BAG
Filed March 11, 1964
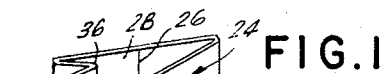
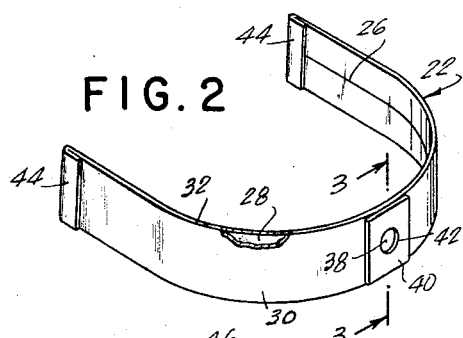
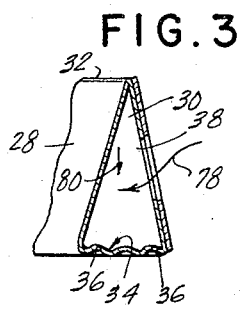
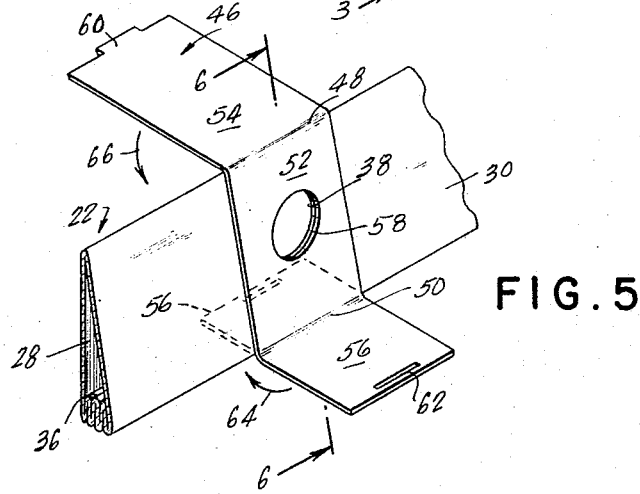
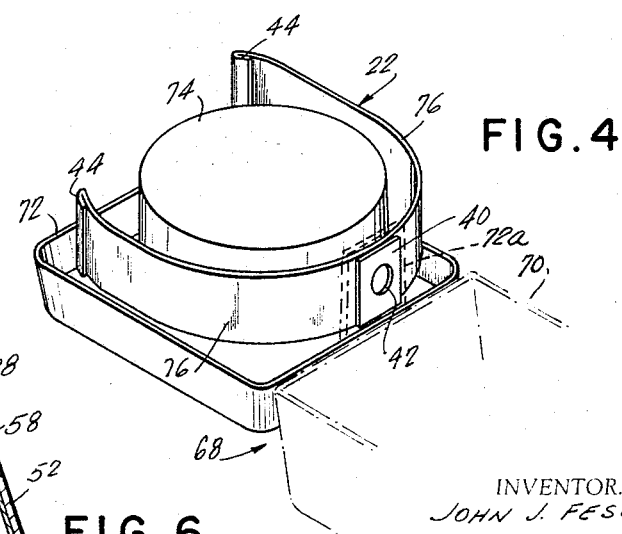
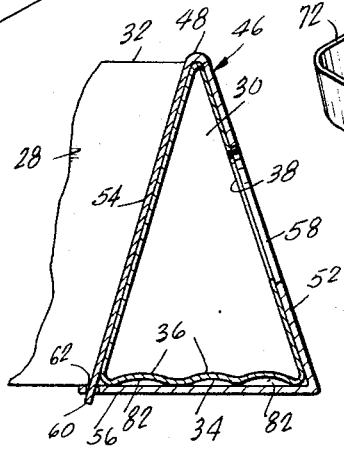
INVENTOR.
JOHN J. FESCO
BY
Friedman & Goodman
ATTORNEYS United States Patent Office 3,297,231
Patented Jan. 10, 1967

3,297,231
DISPOSABLE FILTER BAG
John J. Fesco, Baldwin, N.Y., assignor to Studley Paper Company, Inc., a corporation of New York
Filed Mar. 11, 1964, Ser. No. 351,165
1 Claim. (Cl. 229—53)

The present invention relates to a disposable filter bag for a suction or vacuum cleaner.

Filter bags of the type to which the present invention relates must be formed or fabricated so as to seat within the casing of the particular type of vacuum cleaner with which the filter bag will be used. As a result, the configuration of the filter bag is dependent upon the construction or configuration of the associated vacuum cleaner. In one type of vacuum cleaner, generally known as a cannister vacuum cleaner, it is necessary to use an elongated type of filter bag which must be disposed in curved or arcuate condition within the cannister or vacuum cleaner. The mouth of the filter bag through which the dust laden air enters the filter bag is located between the ends thereof. When the bag is disposed within the vacuum cleaner, the mouth is separated or spaced from each of the ends by arcuate portions or bends of the filter bag resulting from its location or disposition within the vacuum cleaner. As a result, the dirt and dust which is deposited within the filter bag is not driven beyond the bend in the filter bag toward the respective ends thereof. This results in a reduction in the efficiency of the filter bag since the deposited dust tends to collect around both sides of the mouth and is not moved toward the distant ends, with the result that the full capacity of the bag is not utilized. Moreover, filter bags of the described type have heretofore been of generally rectangular configuration having pleated walls which the user of the vacuum cleaner had to physically open or spread so that the pleats would be physically extended for proper operation of the filter bag. This required an additional operation in order to place the vacuum cleaner in use.

In view of the foregoing, it is an object of the present invention to provide a highly novel filter bag for a vacuum cleaner which obviates the listed disadvantages of prior art filter bags.

It is another object of the present invention to provide a filter bag wherein provision is made to drive the dirt trapped within the filter bag to the remote ends of the filter bag which is of the type which has an entrance opening substantially centrally of both ends.

It is another object of the present invention to obviate the necessity for physically opening or spreading the pleated walls of the filter bag in order to properly use the same.

It is a further object of the present invention to provide a filter bag wherein a pleated wall is eliminated and wherein the dirt laden air stream is deflected and turbulence is created so as to drive the removed dirt toward the remote ends of the bag and beyond the bends therein.

Other and further objects and advantages of the present invention will be readily apparent to those skilled in the art from a consideration of the following specification taken in connection with the appended drawing which illustrates the best mode presently contemplated for carrying out the invention.

In the drawing:

FIGURE 1 illustrates a blank from which a bag pursuant to the present invention is formed.

FIGURE 2 illustrates a filter bag pursuant to the present invention with a portion broken away for purposes of illustration.

FIGURE 3 is a sectional view on an enlarged scale taken on the line 3—3 of FIGURE 2.

FIGURE 4 illustrates the filter bag positioned within a vacuum cleaner.

FIGURE 5 is a fragmentary view which illustrates the application of a collar to the filter bag of the present invention.

FIGURE 6 is a fragmentary view taken on the line 6—6 of FIGURE 5.

Referring now to the drawings in detail, FIGURE 1 illustrates a folded blank from which the filter bag 22 pursuant to the present invention is formed. It will be noted that the folded blank 20 is formed from an elongated sheet of material such as flexible porous paper, which is normally employed in forming vacuum cleaner disposable filter bags. The original sheet material is formed by conventional bag manufacturing machinery into an elongated tube 24 having the longitudinal edges thereof suitably sealed together as at 26. Suitable lengths of tubular sections 24 are provided by the conventional paper bag making machinery.

Pursuant to an important feature of the present invention, the tubes 24 are formed into the triangular configuration as best shown in FIGURE 3. Each tube is provided with the pair of converging side walls 28 and 30 which are joined together along the apex 32. The bottom wall or base of the triangular conformation is identified by the reference numeral 34 and is provided with a plurality of longitudinal pleats 36. Substantially centrally thereof, the side wall 30 is provided with an entrance aperture 38. A reinforcing plate or flat mounting collar 40 which is provided with a central aperture 42 is suitably secured or mounted on the outer surface of the wall 30 so that the aperture 42 thereof is in registry with the wall aperture 38. In order to form the tube 24 into the bag 22, the opposite open ends of the tube 24 are folded over and secured together to form sealed ends as indicated by the folded ends 44 of the bag 22.

The bag 22 may be provided with a modified form of mounting collar 46. As here shown, particularly in FIGURES 5 and 6, the collar 46 is formed of a blank of suitable material preferably a paper board or cardboard which is provided with the transverse fold lines 48 and 50 so as to define a central panel or wall 52 and a pair of outer panels or walls 54 and 56. The central panel 52 of collar 46 is provided with a central aperture 58 which is similar to the aperture 38 in the wall 30 and the aperture of 42 in the collar member 40. However, it will be understood that the collar 46 is utilized in lieu of the plate or collar 40. Consequently, it will be noted as best shown in FIGURES 5 and 6 that the collar 46 when provided on the bag 22 represents another embodiment of the invention from that shown in FIGURE 2 having the bag 22 provided with the reinforcing plate or collar 40. It will be noted that the collar 46 differs from the collar 40 in that the collar 40 is mounted only on the wall 30. However, the collar 46 is mounted on the bag so as to surround or encompass the three walls of the latter. For this purpose, the panel 54 of the collar 46 is provided with a projecting end tab 60 and the panel 56 of the collar 46 is provided with an end slot 62 in which the tab 60 is engageable. In order to mount the collar 46 on the bag 22, the panel 52 is positioned and adhesively secured on the wall 30 so that the panel aperture 58 is in registry with the wall aperture 30 the fold line 38 being in registry with the apex 32 of the bag 22. The panel 56 is then folded under the bottom wall 34 of the bag as indicated by the arrow 64 so as to be disposed in the broken line position thereof shown in FIGURE 5. The end panel 54 is then folded downwardly at the fold line 48 as indicated by arrow 66 and the free end tab 60 is then inserted into the slot 62 so as to mount the collar on the bag as best shown in FIGURE 6.

In order to insert or mount the bag 22 within the vacuum cleaner which is generally designated by the reference numeral 68, the cover 70 of the vacuum cleaner is moved to the open position thereof illustrated in FIGURE 4. The bag 22 is then inserted into the base 72 of the vacuum cleaner so as to surround or encompass the suction mechanism 74. The collar is engaged by a suitable support indicated by the broken line 72a. It will be noted, as best shown in FIGURE 4, that the bag 22 is disposed in arcuate condition in the base 72 so that the collar 40 is spaced from the remote ends 44 and the bends 76 are formed in the bag 22.

The cover 70 is then closed on the base 72 and the inlet end of the vacuum cleaner air hose (not shown) is inserted into the bag 22 in conventional fashion through the opening 42 in the collar 40 and the underlying opening 38 in wall 30 of the bag. The dust laden air will enter the bag through said openings as indicated by the arrowhead 78 in FIGURE 3. Due to the triangular cross-section of the filter bag, the dust laden air when striking the downwardly inclined wall 28 will be deflected downwardly toward the stream of entering air indicated by the arrow 78, the downwardly and inwardly deflecting air being indicated by the arrow 80. As a result of the intermixture of the downwardly deflected air stream 80 with the entering air stream 78, there is developed a general condition of air turbulence within the triangular shaped bag 22. This air turbulence, it will be readily apparent, results from the fact that the bag is of triangular conformation so that the air which strikes the wall 28 opposite the opening 38 in the wall 30 must of necessity be deflected in a generally downward condition across the incoming air flow. The resultant turbulence which thus developed tends to blow or force the air within the bag towards the opposite ends 44 thereof around or past the bends 76. As a result, the dust laden air is always blown toward the closed ends 44 of the bag so as to initially deposit the dust or dirt drawn by the air at the ends and gradually build up the accumulation of the dust toward the entrance opening. This is quite different from prior art bags which did not have the triangular conformation of the present bag with the result that the dust or dirt tended to accumulate at the bends 76 with the result that the capacity of the bag between the bends 76 and the remote ends of 44 was never utilized. In the prior art due to the lack of the converging wall 28 which is related as shown in FIGURE 3 to the converging wall 30, the dust laden dirt merely tended to drop downwardly toward the bottom wall 34 and not be forced passed or around the bends as in the bag pursuant to the present invention.

It will be apparent that the foregoing action results from the utilization of the bag 22 regardless of whether the single planar collar 40 is utilized or whether the three collar panel 46 is utilized, it being understood that the operation of the bag is exactly the same. However, it will be noted that due to the fact that the collar 46 completely encircles the bag, it provides additional strength or support to the bottom wall as well as to the rear wall 28 at the point where the relatively strong flow of air enters the bag.

It will be noted that pursuant to the present invention, there is no top wall in applicant's bag 22. In lieu of the top wall, provision is made for the fold or apex 32 of the triangle defined by the side walls 28, 30 and the bottom wall 34. This obviates the necessity to spread apart a pleated top wall where such a wall is utilized in place of applicant's fold or apex 32. Consequently, it will be apparent that by eliminating the necessary step of opening a pleated upper wall, applicant has simplified the operation of the vacuum cleaner.

As best noted in FIGURES 3 and 6, when the bag is in the fully opened position thereof, the pleated bottom wall is provided with undulations represented by the fully opened pleats. These undulations never form a fully planar wall. As a result, the dust laden air entering the bag 22 can filter through the walls thereof, including the bottom wall since an air space is always provided between the bottom wall of the bag and the surface upon which the bottom wall rests due to the undulating character of the bottom wall. Such an air space is indicated in FIGURE 6 by the reference numerals 82.

In view of the foregoing, it will be apparent that there has been illustrated and described a highly novel and superior vacuum cleaner filter bag. However, it will be understood that various changes and modifications may be made therein without, however, departing from the basic inventive concept thereof as set forth in the appended claim.

I claim:

A cannister vacuum cleaner filter bag comprising an elongated tubular member formed of air permeable sheet material, said member having a pair of elongated opposing side walls diverging from a common fold line and a bottom wall extending between said side walls to define a transverse triangular cross-sectional conformation for said member, said tubular member being closed at the opposite ends thereof, and an opening defined substantially centrally of one of said side walls whereby dirt laden air entering said opening will strike the opposing side wall to deflect said air creating air currents extending toward both said opposite ends, said bottom wall having a plurality of pleats defined therein which extend longitudinally of said member, and collar overlying said one side wall and having an aperture in registry with said wall opening, said collar being folded over said side and bottom walls, the opposite ends of said collar being secured together below said bottom wall.

References Cited by the Examiner

UNITED STATES PATENTS

| | | | |
|---|---|---|---|
| 2,279,327 | 4/1942 | Kehr. | |
| 2,703,426 | 3/1955 | Barkl | 229—53 |
| 2,780,828 | 2/1957 | Brace | 229—53 |
| 2,864,462 | 12/1958 | Brace | 229—62.5 |
| 2,975,862 | 3/1961 | Goldberg | 229—62.5 |
| 3,029,012 | 4/1962 | Leslie | 229—62.5 |

JOSEPH R. LECLAIR, *Primary Examiner.*

FRANKLIN T. BARRETT, *Examiner.*

V. A. TOMPSON, R. PESHOCK, *Assistant Examiners.*